(12) United States Patent
Nilsson

(10) Patent No.: US 10,742,303 B1
(45) Date of Patent: Aug. 11, 2020

(54) CONFIGURATION OF SPATIALLY QCL REFERENCE SIGNAL RESOURCES FOR TRANSMISSIONS IN COMMUNICATION EQUIPMENT HAVING MULTIPLE ANTENNA PANELS

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 420 days.

(21) Appl. No.: 15/757,345

(22) PCT Filed: Feb. 13, 2018

(86) PCT No.: PCT/EP2018/053573
§ 371 (c)(1),
(2) Date: Mar. 2, 2018

(87) PCT Pub. No.: WO2019/158186
PCT Pub. Date: Aug. 22, 2019

(51) Int. Cl.
*H04B 7/08* (2006.01)
*H04B 7/06* (2006.01)
(Continued)

(52) U.S. Cl.
CPC .......... *H04B 7/088* (2013.01); *H04B 7/0695* (2013.01); *H04L 5/0051* (2013.01);
(Continued)

(58) Field of Classification Search
CPC .... H04B 7/088; H04B 7/0695; H04B 7/0408; H04B 7/0413; H04B 7/06; H04B 7/0626;
(Continued)

(56) References Cited

U.S. PATENT DOCUMENTS 10,159,071 B2 * 12/2018 Park .................... H04W 72/042
2007/0254655 A1 * 11/2007 Tujkovic ............. H04L 25/0226
455/435.1
(Continued)

FOREIGN PATENT DOCUMENTS

WO 2018009462 A1 1/2018

OTHER PUBLICATIONS

3GPP TS 38.214 V 15.0.0, Dec. 2017, 3rd Generation Partnership Project; Technical Specification Group Radio Access Network; NR; Physical layer procedures for data, Release 15, pp. 1-71.
(Continued)

*Primary Examiner* — Dady Chery
(74) *Attorney, Agent, or Firm* — Leffler Intellectual Property Law, PLLC; Kenneth B. Leffler

(57) ABSTRACT

Spatially Quasi Co-Located (QCL) reference signal resources are configured in a wireless communication device having a plurality of antenna panels. Information indicating a number of antenna panels in the wireless communication device is obtained, and a corresponding number of reference signal resource sets is selected that are to be used in a reference signal resource selection process, wherein each reference signal resource set includes identities of one or more reference signal resources to be used by the wireless communication device when transmitting a sounding reference signal. The wireless communication device is informed about which reference signal resource sets have been selected. From each of the antenna panels, the sounding reference signal is received on each one of a plurality of transmissions, each performed by the antenna panel using a different one of the reference signal resources of the reference signal resource set selected for the antenna panel. For each reference signal resource set, the received transmissions from the antenna panels are assessed, and a best
(Continued)

transmission is selected therefrom based on predefined transmission selection criteria, and for each best transmission a corresponding reference signal resource is selected that was used in performance of the best transmission. Information indicating the selected reference signal resources is sent in one higher layer data structure. The wireless communication device used this information to update a sounding reference signal resource set this is to be used for subsequent transceiver operations.

20 Claims, 13 Drawing Sheets

(51) Int. Cl.
*H04W 80/02* (2009.01)
*H04L 5/00* (2006.01)
*H04W 76/27* (2018.01)
*H04L 25/02* (2006.01)

(52) U.S. Cl.
CPC ......... *H04L 25/0226* (2013.01); *H04W 76/27* (2018.02); *H04W 80/02* (2013.01)

(58) Field of Classification Search
CPC . H04L 25/0226; H04L 5/0051; H04L 5/0053; H04L 27/2613; H04L 5/0035; H04L 5/0048; H04L 5/00; H04L 5/0023; H04L 5/005; H04W 76/27; H04W 80/02; H04W 72/04; H04W 72/0446
See application file for complete search history.

(56) References Cited

U.S. PATENT DOCUMENTS

| | | | | |
|---|---|---|---|---|
| 2014/0198763 A1* | 7/2014 | Sorrentino | .......... | H04L 27/2675 370/330 |
| 2015/0124688 A1* | 5/2015 | Xu | ...................... | H04L 27/2607 370/312 |
| 2018/0054797 A1* | 2/2018 | Islam | .................. | H04W 64/006 |
| 2018/0219605 A1* | 8/2018 | Davydov | ............. | H04B 7/0862 |
| 2018/0288737 A1* | 10/2018 | Islam | .................... | H04W 68/02 |
| 2019/0068260 A1* | 2/2019 | Yan | ....................... | H04L 5/0048 |
| 2019/0239092 A1* | 8/2019 | Zhou | ...................... | H04B 7/088 |
| 2019/0335399 A1* | 10/2019 | Wang | .................... | H04L 5/0051 |
| 2019/0379431 A1* | 12/2019 | Park | ..................... | H04B 7/0408 |
| 2020/0112355 A1* | 4/2020 | Park | .......................... | H04L 5/00 |
| 2020/0120531 A1* | 4/2020 | Qin | ...................... | H04L 5/0051 |
| 2020/0128523 A1* | 4/2020 | Chen | .................... | H04B 7/0617 |

OTHER PUBLICATIONS

PCT International Search Report, dated Nov. 6, 2018, in connection with International Application No. PCT/EP2018/053573, all pages.
PCT Written Opinion, dated Nov. 6, 2018, in connection with International Application No. PCT/EP2018/053573, all pages.
3GPP TSG RAN WG1 Meeting #90, R1-1712299, Prague, Czechia, Aug. 21-25, 2017, ZTE, "UL beam management to NR MIMO", pp. 1-7.
India Office Action dated Jun. 8, 2020 in connection with India Application No. 201847007840, 7 pages.

* cited by examiner

CONFIGURATION OF SPATIALLY QCL REFERENCE SIGNAL RESOURCES FOR TRANSMISSIONS IN COMMUNICATION EQUIPMENT HAVING MULTIPLE ANTENNA PANELS

BACKGROUND

The present invention relates to mobile communications system equipment having multiple antenna panels that are used for Multiple Input Multiple Output (MIMO) transmissions, and more particularly to technology for configuring spatially Quasi Co-Located (QCL) reference signal resources for use by the mobile communications system equipment when performing transmissions, such as codebook based MIMO transmissions.

The standardized organization of communications networks, as well as the designs of individual network elements and other equipment that form and/or interact with the network, continue to evolve in response to ever increasing demands for higher performance and capacity in mobile communications systems. One aspect of this evolution involves the use of the electromagnetic spectrum in bands located at higher frequencies than have been used in earlier generation equipment. This use means, in turn, that narrow beam transmission and reception schemes will be needed at higher frequencies to compensate for the high propagation loss between the User Equipment (UE) and the networks' Transmission/Reception Point (TRP). As used in this specification, the term UE can refer to any wireless communication device that is directly operated by an end user such as, but not limited to, the following examples: cellular or other wireless telephones, personal digital assistants, tablets and other personal computing devices equipped with wireless communication equipment, machine type communication devices, and the like. Further, as used throughout this specification, the term TRP can refer to any radio communication equipment such as, but not limited to, the following examples: Base Transceiver Stations (BTS), Base Station Controllers (BSC), relay nodes (RN), Remote Radio Heads (RRH), NodeB, eNodeB, gNodeB (gNB), and the like, such being defined by the various communications standards promulgated by standardization bodies (e.g., Third Generation Partnership Project—3GPP), such as Global System for Mobile Communication (GSM), Universal Mobile Telecommunications Service (UMTS), Long Term Evolution (LTE), and most recently, New Radio (NR). Such network equipment may be referred to herein as "nodes". Historically, such nodes have been implemented as processing equipment configured in one location. More recently, the functionality of a single node may in some, but not necessarily all, instances be distributed among a plurality of processing elements that are distributed within the communications network, and which interact with one another in a seamless way such that any device interacting with such a virtual node has no way of knowing whether the functionality is being provided by a single processing equipment (herein also referred to as "element") or by a plurality of communication network elements. To facilitate the discussion, this description will refer to communications between a UE and a network node. However, it will be understood that the term "network node" refers to any type of TRP that is capable of carrying out the described functionality, regardless of implementation (e.g., the term "network node" can refer to one or more communication network elements cooperating within the network to accomplish functions attributed to the "node").

For a given communication link, beams can be applied at the network node and also at the UE (one transmitting, the other receiving), which will herein be referred to as a beam pair link (BPL). A beam management procedure is performed, whose task is to establish and maintain beam pair links To illustrate this point, FIG. 1 depicts a network node 101, a UE 103, and a BPL 105 that connects them. In order to establish the BPL 105, the network node may have tried any of the candidate beams 107, before settling on a best one for use in the BPL 105. The network thereafter maintains the BPL 105 for further communication between the UE 103 and network node 101. Both the transmit and receive beams of the BPL 105 are established and monitored by the network using measurements on downlink reference signals used for beam management. For example, it has been agreed by the 3GPP in its standardization of NR, that Channel State Information-Reference Signals (CSI-RS) will be the beam reference signals. The CSI-RS for beam management can be transmitted periodically, semi-persistently or aperiodically (event triggered), and they can be either shared between multiple UEs or be UE-specific. In order to find a suitable network node beam, the network node transmits CSI-RS in different network node transmission (TX) beams on which the UE performs Reference Signal Received Power (RSRP) measurements, and reports back some number (N) of the best node TX beams (where N can be configured by the network). Furthermore, the CSI-RS transmission on a given node beam can be repeated to allow the UE to evaluate suitable UE beams (i.e., UE reception—RX—beam training).

There are primarily three different implementations of beamforming, both at the network node and at the UE: analog beamforming, digital beamforming and hybrid beamforming. Each implementation has its pros and cons. Digital beamforming is the most flexible solution but also the costliest due to the large number of required radios and baseband chains. Analog beamforming is the least flexible but the cheapest to manufacture due to reduced number of required radio and baseband chains. Hybrid beamforming is a compromise between the analog and digital beamforming implementations.

One type of beamforming antenna architecture that has been agreed to study in 3GPP for the NR access technology involves the use of antenna panels, both at the network node side and at the UE. A panel is an antenna array of single- or dual-polarized elements with typically one transmit/receive unit (TXRU) per polarization. An analog distribution network with phase shifters is used to steer the beam of each panel. FIGS. 2A and 2B illustrate two examples of dual-polarized panels, with FIG. 2A illustrating a two-dimensional panel 201, and FIG. 2B illustrating a one-dimensional panel. The two-dimensional panel 201 has a pair of connection points 205 for connection to one TXRU (not illustrated), one connection point per polarization. The one-dimensional panel 203 is similarly configured with a pair of connection points 207.

Uplink Beam Management

Some UEs might have analog beamformers without beam correspondence, which means that Downlink/Uplink (DL/UL) reciprocity cannot be used to determine the beams for these beamformers. For such UEs, the UE beam used for UL cannot be derived from beam management procedures based on DL reference signals as described above. To handle such UEs, UL beam management has been included in the NR standard specification for release 19. The main difference between normal beam management and UL beam management is that UL beam management utilizes uplink reference signals instead of DL references signals. The UL reference signals that have been agreed to be used for UL beam management are Sounding Reference Signals (SRS). Two UL beam management procedures, called U2 and U3, have been discussed during the standardization of NR. These are schematically illustrated in FIGS. 3A and 3B, respectively. Looking first at FIG. 3A, the U2 procedure is performed by transmitting a burst of SRS resources in one UE TX beam 301 and letting the network node 303 evaluate different TRP RX beams 305. And as illustrated in FIG. 3B, the U3 procedure lets the network node 303 select a suitable ("best") UE TX beam by having the UE 307 transmit different SRS resources in different UE TX beams 309, and then assessing the received transmissions based on one or more predefined transmission selection criteria (e.g., comparing the different beams using any of the measurements of received signal quality that are known in the art).

It will be understood that, as used herein, the term "SRS resource" refers to a configuration of a number of parameters that control how one or more SRSs are transmitted, and is exemplified by SRS resources as defined and discussed in, for example, Section 6.2.1 "UE sounding procedure" of the specification, 3GPP TS 38.214 V15.0.0 (2017-12), "3rd Generation Partnership Project; Technical Specification Group Radio Access Network; NR; Physical layer procedures for data (Release 15)", December 2017.

Codebook Based UL Transmission

In addition to their use for UL beam management as described above, SRS resources are also used to help normal UL transmissions, for example when performing a so-called Codebook-based UL transmission, which has been standardized in NR. Codebook based UL transmission relies on a multi-antenna configuration to support uplink MIMO communications with up to 4 layer spatial multiplexing using up to 4 antenna ports with channel dependent precoding. The spatial multiplexing mode aims for high data rates in favorable channel conditions.

FIG. 4 is an exemplary embodiment of an arrangement 400 for performing precoded spatial multiplexing when Cyclic Prefix-Orthogonal Frequency Division Multiplexing (CP-OFDM) is used on the uplink As seen in the figure, information to be transmitted partitioned into a number, r, separate Layers, where the number r is called the "transmission rank." Each Layer 401-x supplies one symbol to a respective one of r inputs of the precoder matrix W, forming an information-carrying symbol vector, s. The symbol vector s is multiplied by an $N_T \times r$ precoder matrix W, which serves to distribute the transmit energy in a subspace of the $N_T$-dimensional vector space (corresponding to $N_T$ antenna ports). The precoder matrix W is typically selected from a codebook of possible precoder matrices, with selection typically being indicated by means of a transmit precoder matrix indicator (TPMI), which specifies a unique precoder matrix in the codebook for a given number of symbol streams The $N_T$ weighted symbols supplied at the output of the precoder matrix W are supplied to respective ones of $N_T$ Inverse Fast Fourier Transform (IFFT) processors 403-x. The outputs of the IFFT processors 403-x are supplied to respective ones of $N_T$ antenna ports. In this way, spatial multiplexing is achieved since multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) (where $N_R$ is the number of receiver antennas) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

Where
$\hat{H}_n$ is a channel estimate, possibly derived from CSI-RS.
$W_k$ is a hypothesized precoder matrix with index k.
$\hat{H}_n W_k$ is the hypothesized equivalent channel.

In closed-loop precoding for the NR uplink, the network node decides, based on channel measurements in the reverse link (uplink), what TPMI the UE should use on its uplink antennas, and transmits this TPMI to the UE. The gNodeB configures the UE to transmit the SRS according to the number of UE antennas it would like the UE to use for uplink transmission, in order to enable the channel measurements. A single precoder that is supposed to cover a large bandwidth (wideband precoding) may be signaled. It may also be beneficial to match the frequency variations of the channel and instead feed back a frequency-selective precoding report, for example, several precoders and/or several TPMIs, one per subband.

Information other than the TPMI is generally used to determine the UL MIMO transmission state, such as SRS resource indicators (SRIs) as well as transmission rank indicators (TRIs). These parameters, as well as the modulation and coding scheme (MCS), and the uplink resources where the Physical Uplink Shared Channel (PUSCH) is to be transmitted, are also determined by channel measurements derived from SRS transmissions from the UE. The transmission rank, and thus the number of spatially multiplexed layers, is reflected in the number of columns of the precoder matrix, W. For efficient performance, it is important that a transmission rank that matches the channel properties be selected.

SRS Resource Set

The network node needs to signal to the UE various parameters that control how the SRS transmission should be done. Such parameters include, for example, which SRS resource to use, the number of ports per SRS resource, and the like. This is solved in NR by defining a number of SRS resource sets using higher layer signaling (e.g., Radio Resource Control—RRC)—and/or Medium Access Control-Control Element—MAC-CE), where each SRS resource set contains a list of different SRS resources. For NR release 15, each UE can be configured to have a number of different SRS resource sets, including:

one SRS resource set for codebook based UL transmission, and multiple SRS resource sets for UL beam management.

The different SRS resources within an SRS resource set can have different time domain behavior. For example in a SRS resource set consisting of four SRS resources, two SRS resources can be configured with periodic time domain behavior, while the other two can be configured with aperiodic time domain behavior. The periodic SRS resources in an SRS resource set are triggered by using RRC signaling, the SRS resources with semi-persistent time domain behavior are triggered by using Medium Access Control/Control Element (MAC/CE) signaling, and the aperiodic SRS resources are triggered by using DCI signaling.

In case the UE is equipped with one or more analog beamformers, the SRS resource sets can be configured with a spatial QCL relation to indicate to the UE which analog UE beam (i.e., BPL) to use during the SRS transmission. The spatial QCL relation is configured using the higher layer parameter SRS-SpatialRelationInfo which can be defined for each SRS resource set. (Multi-layer communications protocols such as The Open Systems Interconnection model—OSI model—are well-known, and as used herein, the term "higher layer" means any layer higher than Layer 1, the Physical Layer.) The SRS-SpatialRelationInfo can point to a DL reference signal such as SSB/PBCH or CSI-RS (in case of beam correspondence) or to UL reference signals such as SRS (in case of no beam correspondence). So, for example, a UE without beam correspondence can first perform a U3 procedure by transmitting different SRS resources in different UE TX beams The network node measures RSRP of the different SRS resources and determines which SRS resource gives the highest RSRP. The network node can then use higher layer signaling to update the SRS-SpatialRelationInfo (for a given SRS resource set) with the best SRS resource. After this update, the next time the UE is triggered for SRS transmission for that SRS resource set, the UE will know which analog UE TX beam to apply when transmitting the SRS resources.

One example for periodic SRS transmissions, is published in the earlier-mentioned specification, 3GPP TS 38.214 V15.0.0 (2017-12), "3rd Generation Partnership Project; Technical Specification Group Radio Access Network; NR; Physical layer procedures for data (Release 15)", December 2017:

For a UE configured with one or more SRS resource configuration(s), and when the higher layer parameter SRS-ResourceConfigType is set to 'periodic': p2 if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, if the higher layer parameter SRS-SpatialRelationInfo is set to 'SRS', the UE shall transmit the SRS resource with the same spatial domain transmission filter used for the transmission of the periodic SRS.

UL Beam Management for Multi-panel UEs

It is expected that the UE will use two or more antenna panels, preferably pointing in different directions, in order to improve the coverage and increase the order of spatial multiplexing. FIG. 5 illustrates a non-limiting example of a UE 501 having two one-dimensional antenna panels 503, 505 located in different directions. In order to handle UL beam management for such UEs in an efficient manner (to minimize overhead), it has been agreed in the NR standard that the network node can trigger the UE 501 to transmit one SRS resource set per UE antenna panel, where each SRS resource set consists of a number of SRS resources (corresponding to the number of candidate beams per UE antenna panel 503, 505). When so triggered, the UE 501 transmits one SRS resource per beam per panel while the network node performs RSRP measurements on the SRS resources. The network node assesses these measurements and determines the best SRS resource per SRS resource set and in that way the network node can determine the best UE TX beam per panel.

The inventor of the embodiments described herein has recognized that the existing technology suffers from one or more problems. For example, conventional technology enables a network node to use higher layer signaling to cause a UE to configure the SRS-SpatialRelationInfo parameter for only a single antenna panel. As a result, a UE having more than one antenna panel but lacking beam correspondence (i.e., having no ability to use DL/UL reciprocity to derive a suitable beam for UL transmissions based on DL reference signals) would still not be able to benefit by the improved performance that would otherwise be achievable if it could know which beam to use for more than one of its antenna panels.

Hence, there is a need for technology that addresses the above and/or related issues.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that configures spatially Quasi Co-Located (QCL) reference signal resources in a wireless communication device having a plurality of antenna panels. Some but not all embodiments encompass aspects performed by one or more communication network elements communicating with the wireless communication device. The one or more communication network elements can collectively be the equivalent of a network node. Such embodiments comprise obtaining information that directly or implicitly indicates a number of antenna panels in the wireless communication device, and selecting, for the antenna panels, a corresponding number of reference signal resource sets to be used in a reference signal resource selection process, wherein each reference signal resource set comprises identities of one or more reference signal resources to be used by the wireless communication device when transmitting a sounding reference signal. The one or more network elements then inform the wireless communication device about which reference signal resource sets have been selected for the plurality of antenna panels. The one or more network elements receive, from each of the antenna panels, the sounding reference signal on each one of a plurality of transmissions, each transmission being performed by the antenna panel using a different one of the reference signal resources of the reference signal resource set selected for the antenna panel. For each one of the antenna panels, the received transmissions from said one of the antenna panels are assessed, and a best transmission is selected from said one of the antenna panels, one of the assessed transmissions, with selection being based on one or more predefined transmission selection criteria. For each best transmission a corresponding reference signal resource is selected that was used in performance of the best transmission. Then, information indicating the selected reference signal resources for the plurality of antenna panels is sent in one higher layer data structure to the wireless communication device.

Some but not all other embodiments encompass aspects performed by the wireless communication device, communicating with the one or more communication network elements. Such embodiments comprise the wireless communication device communicating to the one or more communication network elements, information indicating a number of antenna panels in the wireless communication device. Subsequently, the wireless communication device receives, from the one or more communication network elements, information about which reference signal resource sets have been selected, wherein each reference signal resource set comprises identities of one or more reference signal resources to be used by the wireless communication device when transmitting a sounding reference signal.

The wireless communication system maps a different one of the selected resource sets to respective ones of the antenna panels. Then, for each one of the antenna panels, the wireless communication device performs a plurality of transmissions from said one of the antenna panels, each transmission including a sounding reference signal and being transmitted using a different one of the reference signal resources included in the reference signal resource set that was mapped to said one of the antenna panels. After those transmissions, the wireless communication device receives, in one higher layer data structure, from the one or more communication network elements, information indicating the selected reference signal resources for the plurality of antenna panels. The wireless communication device then uses the received information indicating the selected reference signal resources for the plurality of antenna panels to update a reference signal resource set to be used when performing a subsequent transceiver operation, such as codebook-based UL transmissions or channel sounding for DL reciprocity.

In some but not necessarily all embodiments, the wireless communication device also performs a codebook-based transmission using the updated reference signal resource set.

In other aspects, any of the above mentioned embodiments may be further characterized by the one data structure being a Medium Access Control (MAC) Control Element (CE).

Alternatively, any of the above mentioned embodiments may be further characterized by the one data structure being a Radio Resource Control (RRC) message.

And in yet another alternative, any of the above mentioned embodiments may be further characterized by the one data structure being an SRS-SpatialRelationInfo parameter of an SRS resource set.

BRIEF DESCRIPTION OF THE DRAWINGS

The objects and advantages of the invention will be understood by reading the following detailed description in conjunction with the drawings in which:

FIG. 7 depicts an arrangement of various circuitry configured to perform the actions as set out in the figure.

FIG. 8 depicts an arrangement of various circuitry configured to perform the actions as set out in the figure.

DETAILED DESCRIPTION

Figure 1:
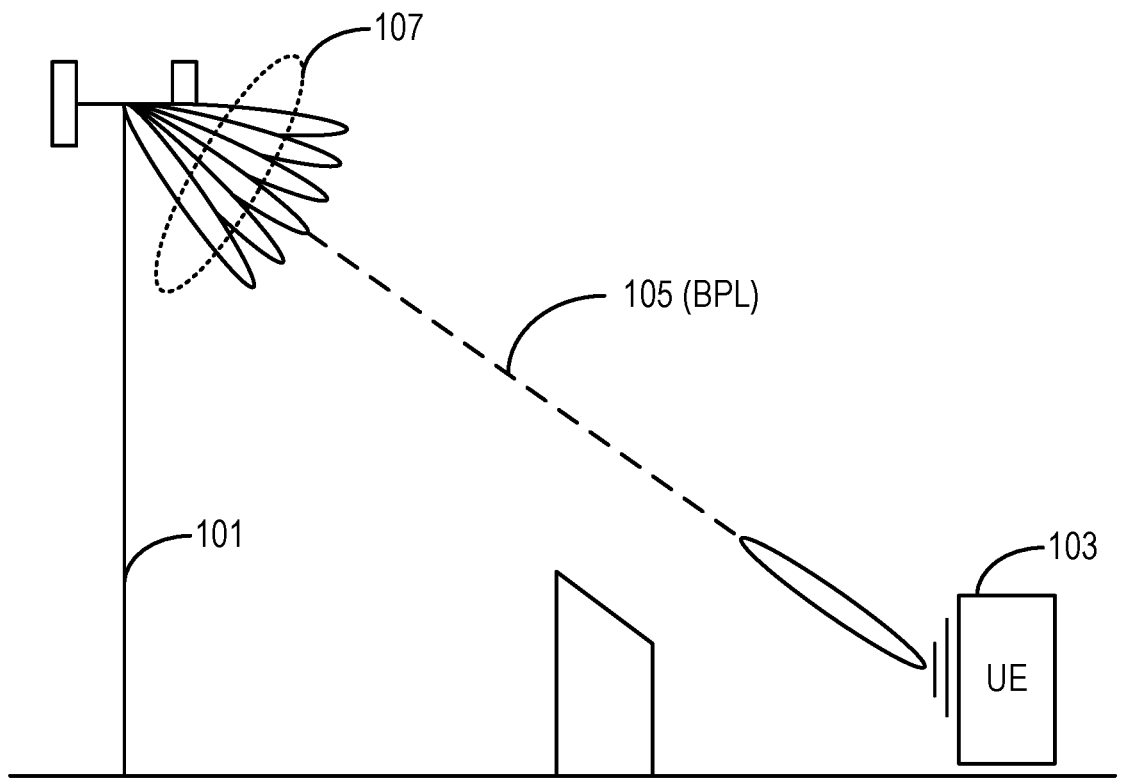
FIG. 1 depicts a network node, a UE, and a BPL that connects them.
Figure 2A:
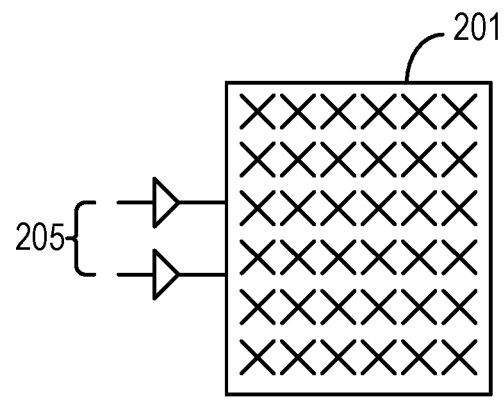
FIGS. 2A and 2B illustrate two examples of dual-polarized panels, with FIG. 2A illustrating a two-dimensional panel, and FIG. 2B illustrating a one-dimensional panel.
Figure 2B:
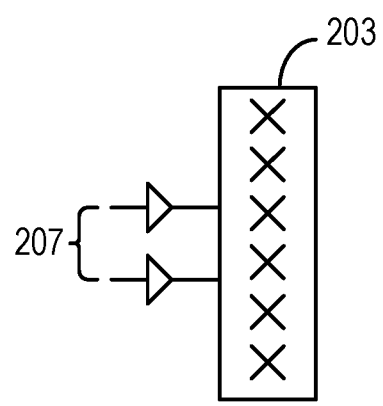
Figure 3A:
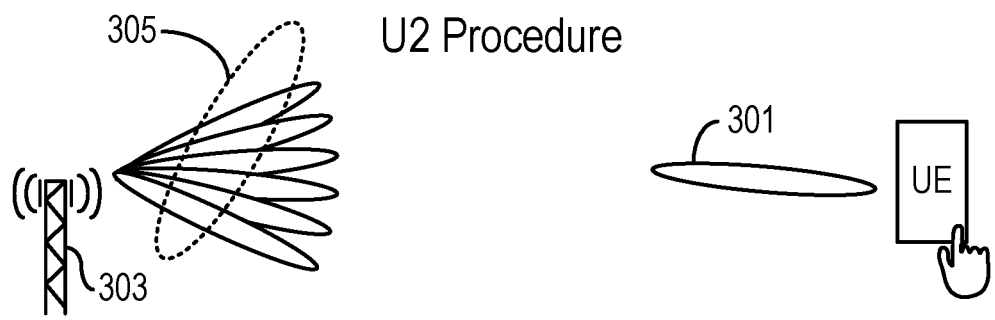
FIGS. 3A and 3B schematically illustrate two UL beam management procedures, respectively called U2 and U3, that have been discussed during the standardization of NR.
Figure 3B:
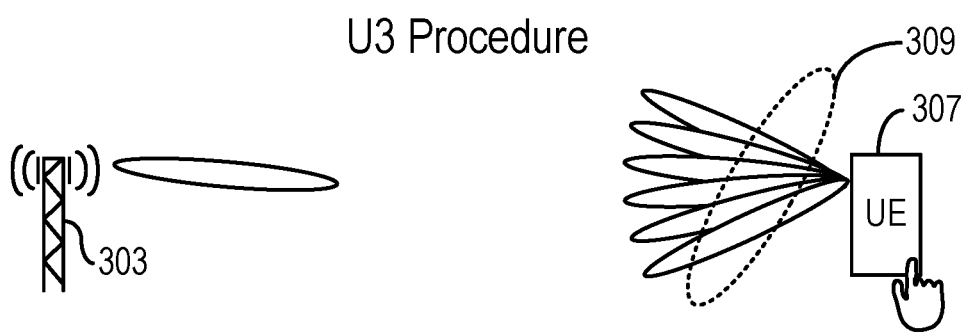
Figure 4:
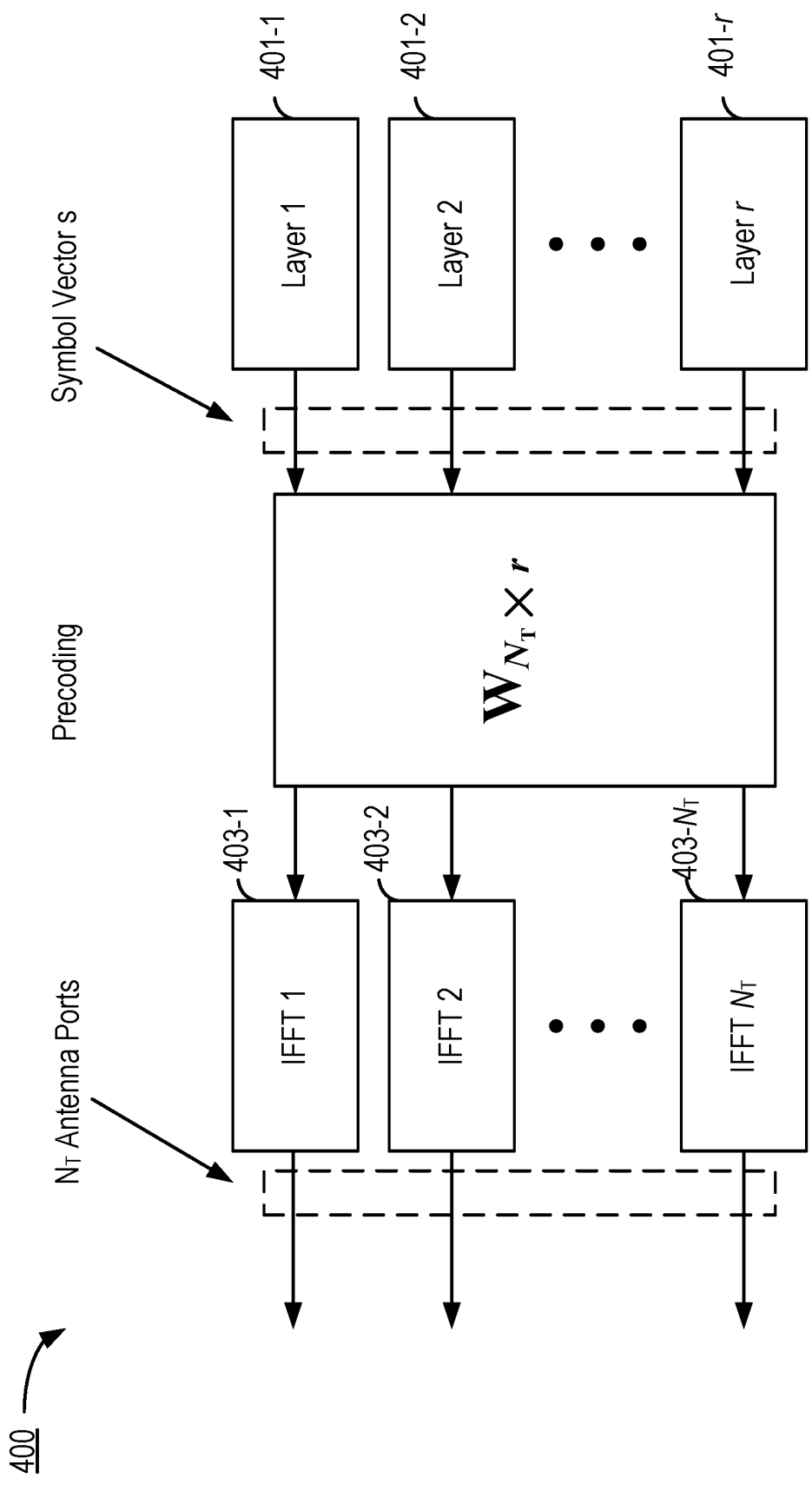
FIG. 4 is an exemplary embodiment of an arrangement for performing precoded spatial multiplexing when CP-OFDM is used on the uplink

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

The inventor of the embodiments described herein has recognized that existing technology suffers from one or more problems due to its inability to configure a suitable beam for more than one antenna panel. As a consequence, even if a UE has multiple antenna panels, it will receive information about which beam to use for only one of them, and this leaves functions such as codebook based UL transmission without the ability to benefit by the use of multiple antenna panels if there is no beam correspondence that would otherwise enable the UE to derive a suitable beam for UL transmissions based on DL reference signals.

In one aspect, the technology described herein provides a mechanism whereby a UE can configure beams for more than one of its antenna panels based on information provided by the network, even when there is no beam correspondence.

In another aspect, an SRS Resource Set is configured to include information indicating which SRS Resource or SRS resources to use for each antenna panel in a UE having more than one antenna panel. In some but not all embodiments, SRS-SpatialRelationInfo parameter in an SRS resource set is configured to identify more than one SRS resource.

These and other aspects will now be described further in the following, in conjunction with the figures.

Figure 6A:
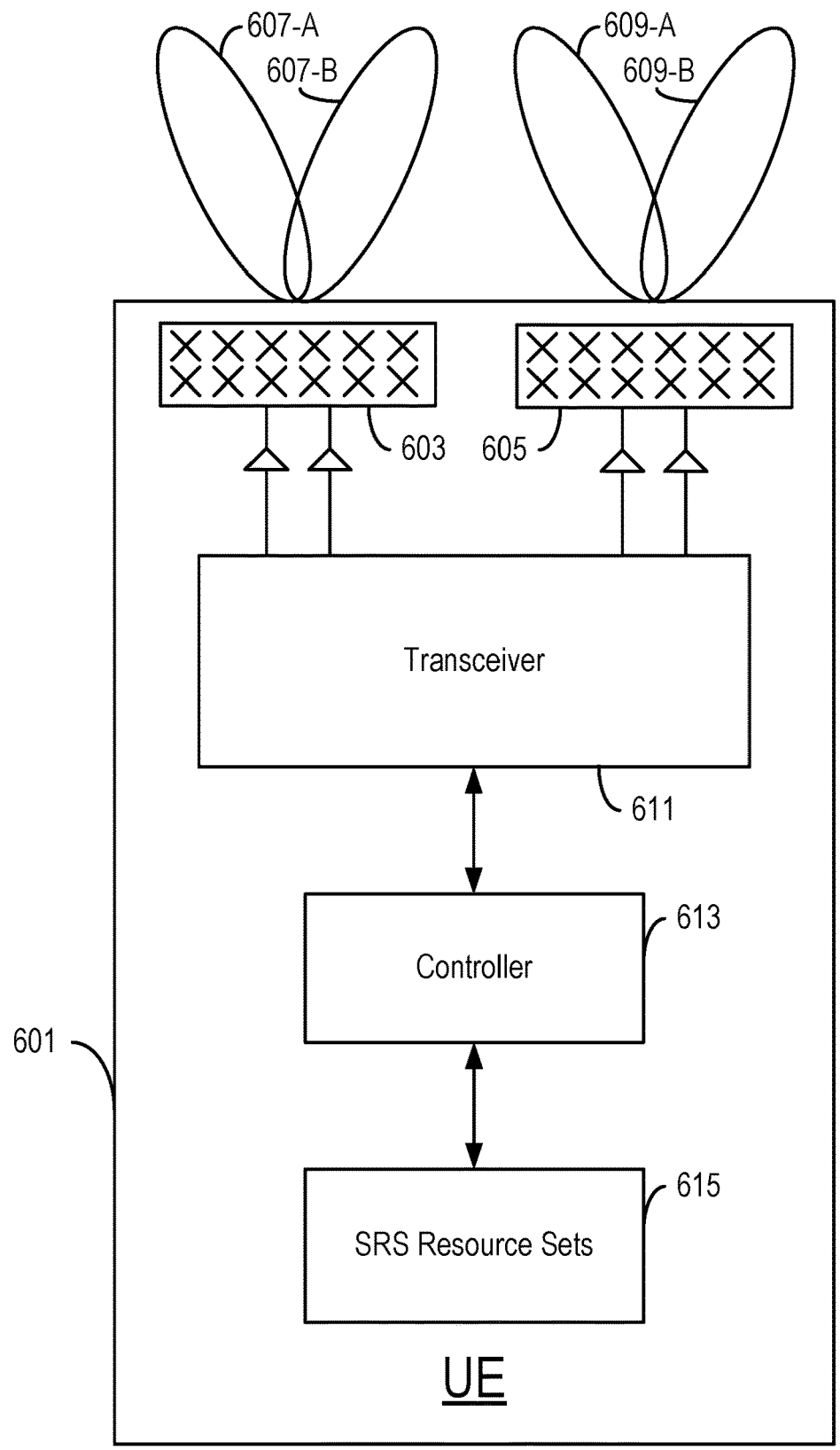
FIG. 6A depicts a UE having two dual-polarized antenna panels with two candidate beams per panel.
Figure 6B:
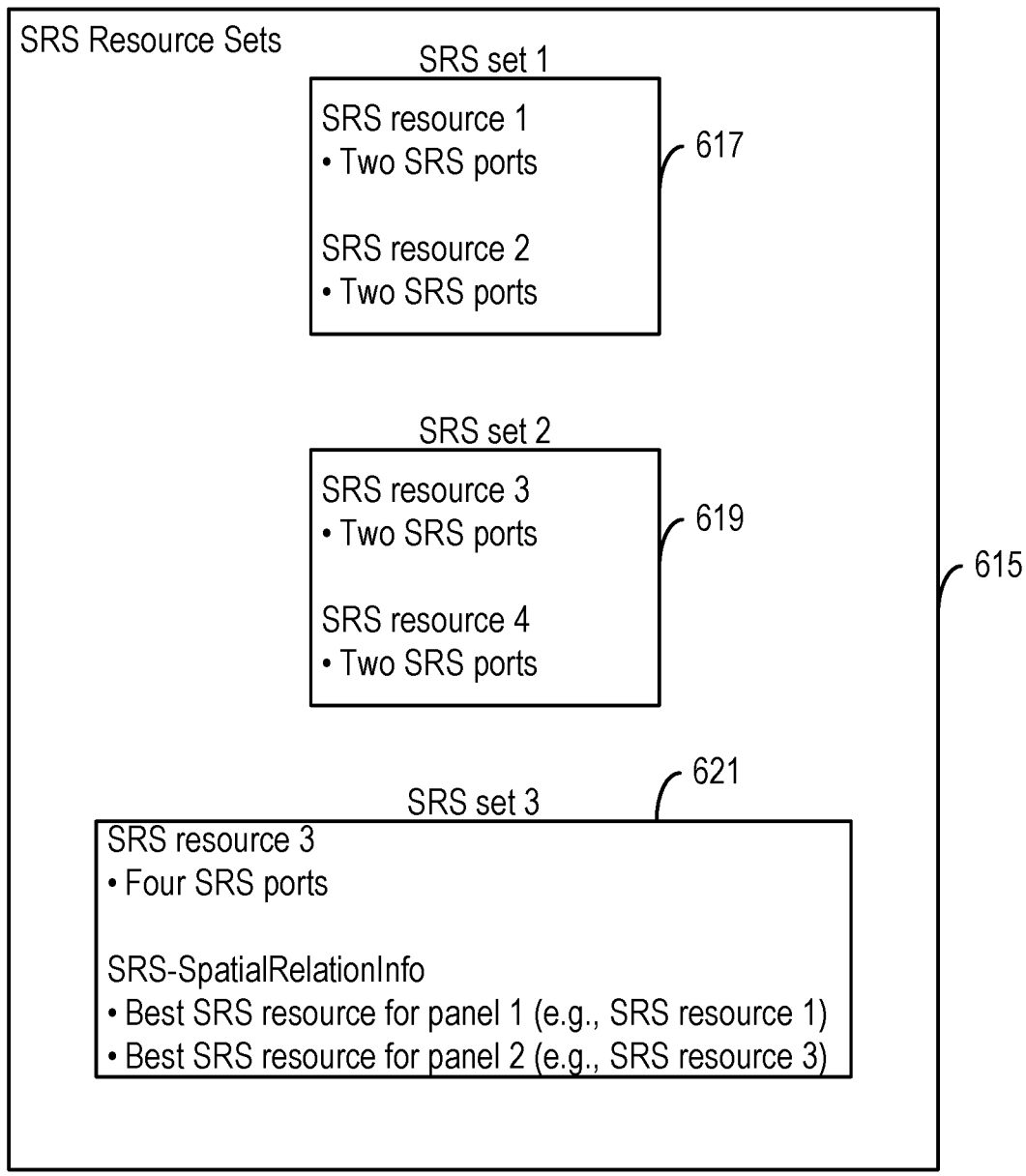
FIG. 6B illustrates an exemplary configuration of three different SRS resource sets, two used by a UE for beam management, and a third SRS resource set being used for codebook based UL transmissions.

Aspects of embodiments consistent with the invention will now be described with reference to FIGS. 6A, 6B, 6C, and 6D. For the sake of example, and without limitation, it will be assumed that a UE is configured like the UE 601 depicted in FIG. 6A, having two dual-polarized antenna panels 603, 605 with two candidate beams 607-A, 607-B, 609-A, 609-B per panel. The UE 601 also includes a transceiver 611, a controller 613, and a plurality of SRS Resource Sets 615. The UE 601 also includes other components, as are known in the art, but these are not depicted. As illustrated in FIG. 6B, and for the sake of this example, it is assumed that the network node has configured the UE 601 with three different SRS resource sets 615, two used for beam management (a first SRS resource set 617, and a second SRS resource set 619) and a third SRS resource set 621 for codebook based UL transmissions.

Figure 6C:
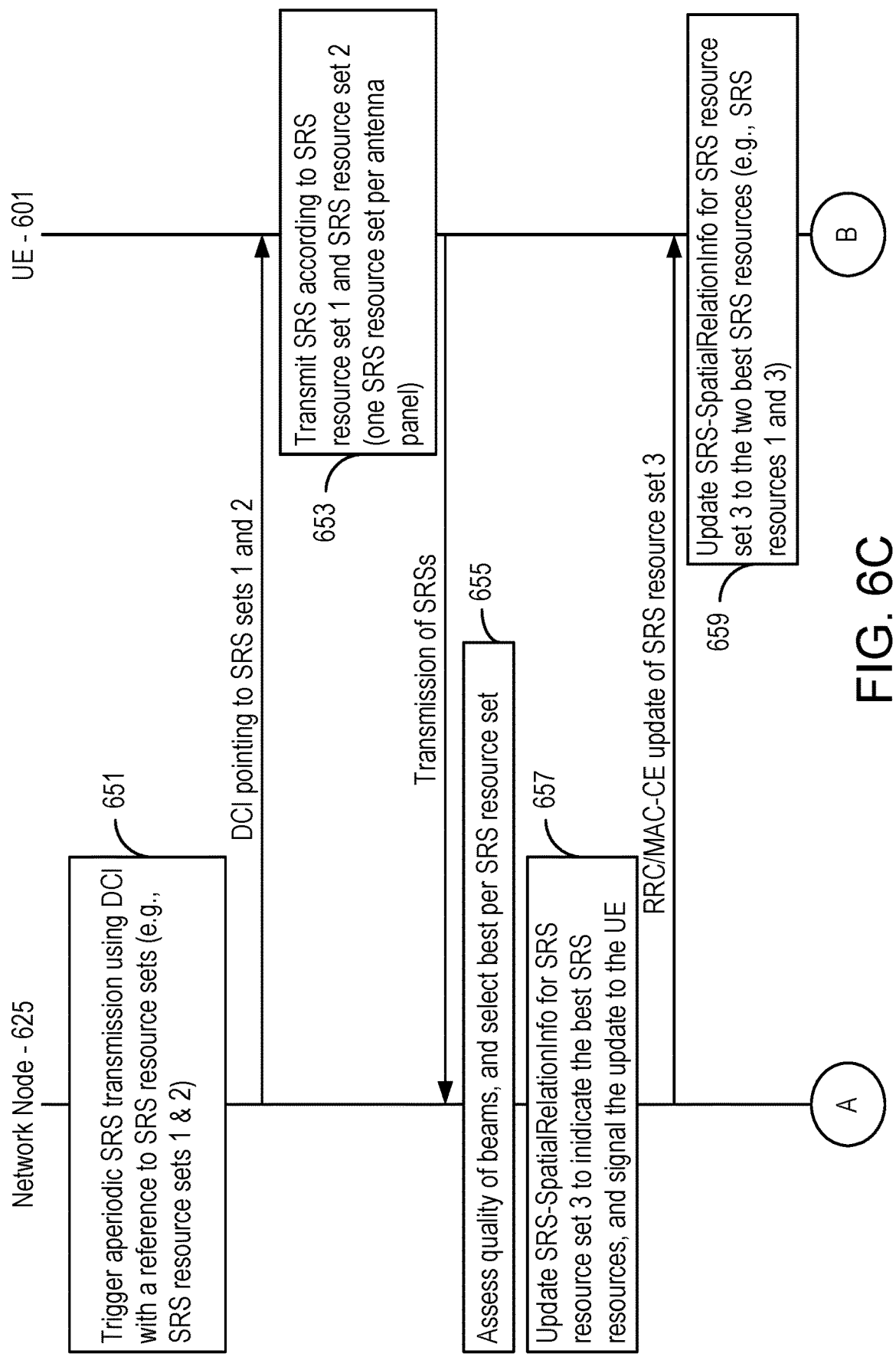
FIGS. 6C and 6D together are a signaling/flowchart of interactions between the UE and a network node for performing UL beam management, and codebook based UL transmission.
Figure 6D:
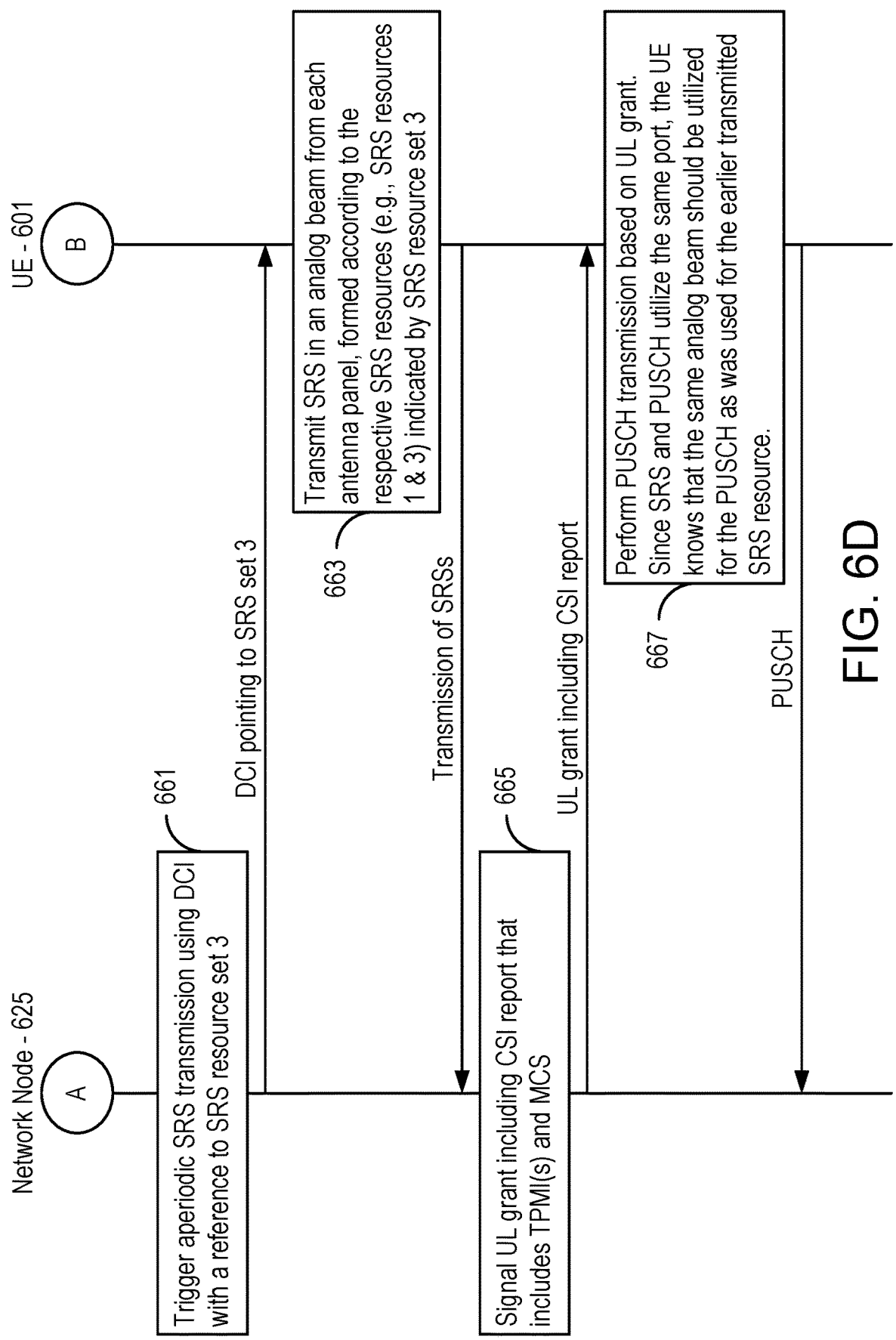

FIGS. 6C and 6D together are a signaling/flowchart of interactions between the UE 601 and a network node 625 for performing UL beam management, and codebook based UL transmission. The illustrated functions start with the network node 625 triggering 651 the UE 601 with aperiodic SRS transmission by signaling, by means of Downlink Control Information (DCI) a pointer to the two SRS resource sets 617, 619 configured for beam management (SRS set 1 and 2). The UE 601 then transmits 653 one SRS per panel, with plural transmissions from the first panel 603 being according to the SRS resources specified by the first SRS resource set 617, and transmissions from the second panel 605 being according to the SRS resources specified by the second SRS resource set 619. Both SRS resource sets in this example consist of two SRS resources, one per beam per panel. As can be seen, each antenna panel 603, 605 consists of two ports (one per polarization), hence each SRS resource consists of two ports. In other examples in which the antenna panels have only one port (e.g., if they comprise only single polarized elements), the SRS resources will correspondingly have one SRS port.

The network node 625 then measures and assesses the RSRP on the different SRS resources and determines a preferred SRS resource per SRS resource set (step 655), which in this example is assumed to be SRS resource 1 for the first SRS set 617 and SRS resource 3 for the second SRS resource set 619. The network node 625 then updates 657 the SRS-SpatialRelationInfo parameter for the third SRS resource set 621 by means of higher layer signaling (e.g., signaling in RRC or MAC/CE) to the UE 601 about the updates. The UE 601 then updates 659 the SRS-SpatialRelationInfo located in the third SRS resource set 621 to indicate the selected resources, SRS resource 1 and SRS resource 3.

Next, the network node 625 triggers an aperiodic SRS transmission of the third SRS resource set 621 (step 661) in order to initiate codebook based UL transmission. In response, the UE 601 transmits 663 SRS resources indicated by the third SRS resource set 621 using the analog beams indicated in the SRS-SpatialRelationInfo parameter of the third SRS resource set 621.

The network node 625 then selects a TPMI and MCS to apply for the PUSCH transmission and signals 665 this back to the UE 601. When the UE 601 transmits 667 the PUSCH using the TPMI signaled from the network node 625, the UE 601 will use the same analog UE beam as was used for transmitting SRS resource set 3, since the port number is the same for the SRS and DMRS used for the PUSCH transmission.

Figure 7:
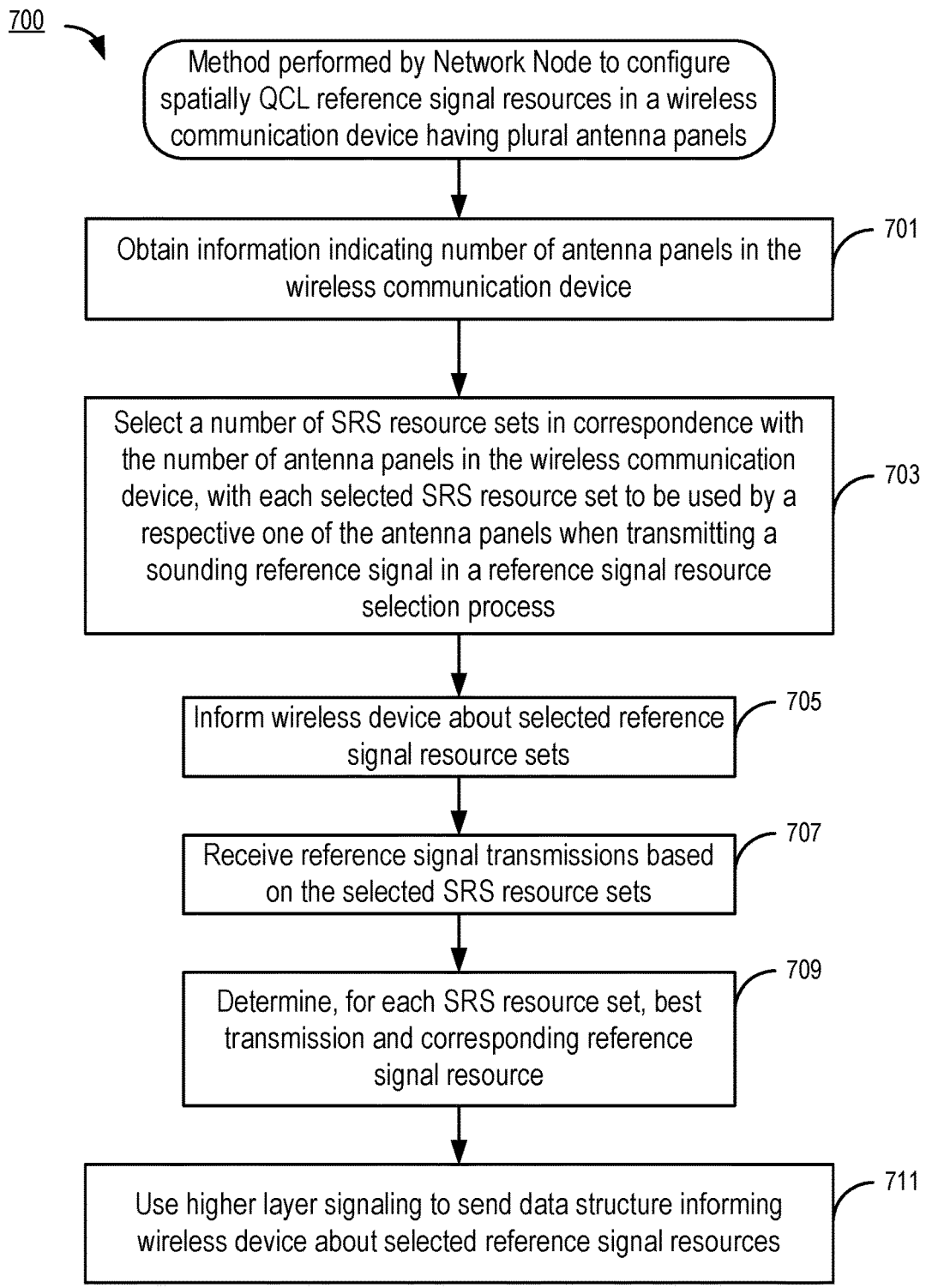
FIG. 7 depicts, in one respect, a flow chart of steps/processes performed by a network node in accordance with some but not necessarily all exemplary embodiments consistent with the invention. In another respect.

Further aspects of embodiments consistent with the invention will now be described with reference to FIG. 7, which depicts, in one respect, a flow chart of steps/processes performed by a network node 625 in accordance with some but not necessarily all exemplary embodiments consistent with the invention. In another respect, FIG. 7 also depicts an arrangement 700 of various circuitry configured to perform the actions as set out in the figure, and as further described herein, such circuitry being comprised in a network node (e.g., one or more communications network elements, such as processors).

The aim of the depicted process is to configure spatially QCL reference signal resources in a UE 601 having more than one antenna panel. The exemplary embodiment begins with the network node 625 obtaining information that directly or implicitly indicates a number of antenna panels in the UE 601 (i.e., how many antenna panels the UE 601 has) (step 701). The network node 625 then selects (step 703) from the groups of SRS resource sets 615, a number of SRS resource sets in correspondence with the number of antenna panels in the wireless communication device, wherein each reference signal resource set comprises identities of one or more reference signal resources to be used by the wireless communication device when transmitting a sounding reference signal from one of its antenna panels (503, 505, 603, 605). The reference signal resources sets were illustrated earlier as the first SRS resource set 617, the second SRS resource set 619, and the third SRS resource set 621. Making selections for each of the antenna panels can be performed in any number of ways, the particular way not being an essential aspect of the technology.

The network node 625 informs the UE 601 about which reference signal resource sets have been selected (step 705), and consequently then expects that the selected SRS resource sets will be assigned by the UE 601 to different antenna panels (503, 505, 603, 605) and used in a reference signal resource selection process. The network node 625 accordingly receives, from each of the antenna panels, the sounding reference signal on each one of a plurality of transmissions (step 707), each transmission being performed by the antenna panel using a different one of the reference signal resources of the reference signal resource set selected for the antenna panel. Then, for each one of the selected SRS resource sets 617, 619, the network node 625 assesses the received transmissions from the antenna panel, and selects as a best transmission from that antenna panel, one of the assessed transmissions based on one or more predefined transmission selection criteria (e.g., best RSRP), and for each best transmission selects a corresponding reference signal resource that was used in performance of the best transmission (step 709).

The network node then uses higher layer signaling (e.g., RRC or MAC/CE) to send in one higher layer data structure, information indicating the selected reference signal resources for each of the SRS resource sets (step 711). The intention of this signaling is to cause the UE 601 to update the SRS-SpatialRelationInfo parameter (or equivalent in other embodiments) to include a selected SRS resource, one for each of its antenna panels.

Figure 8:
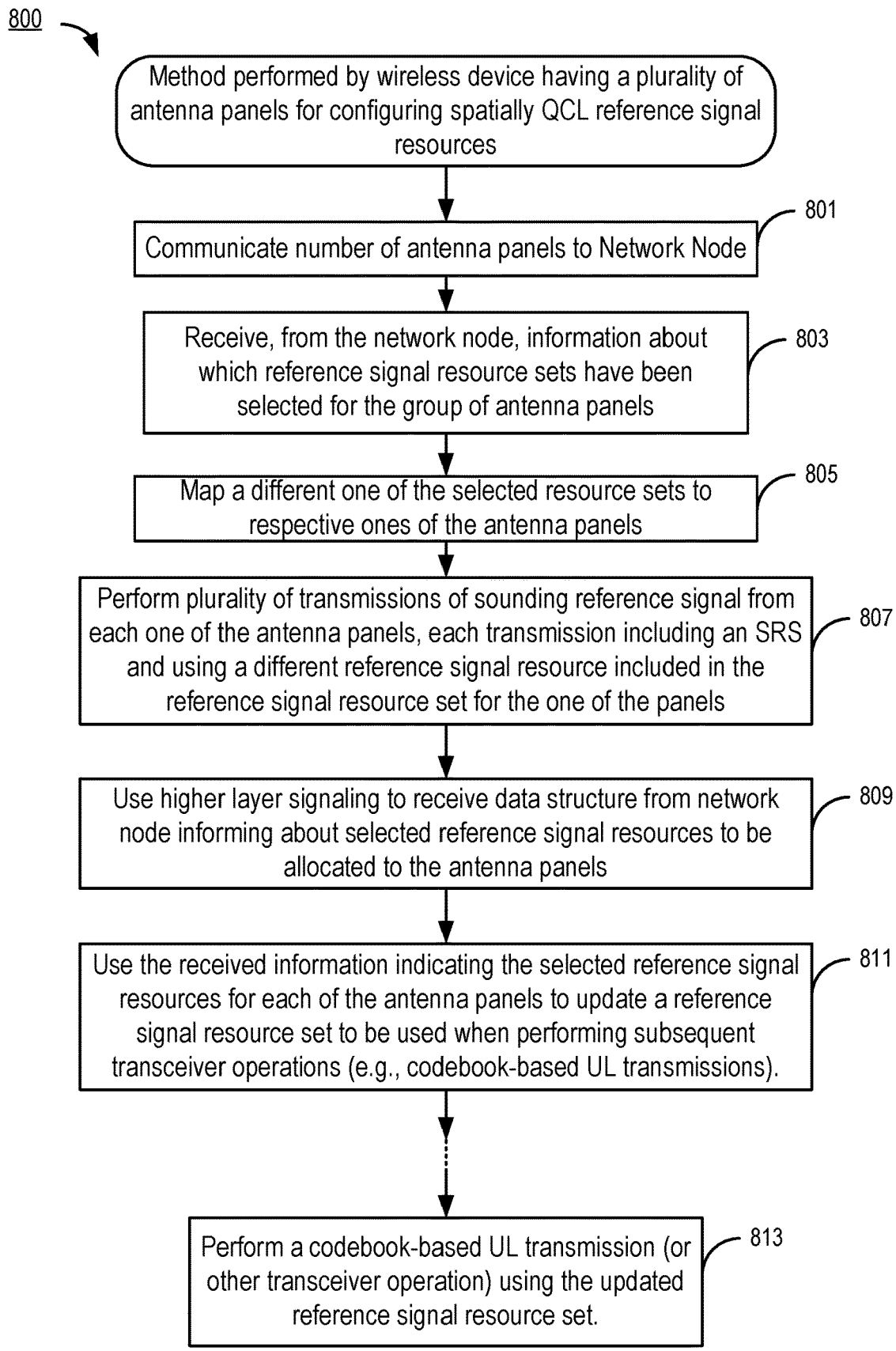
FIG. 8 depicts, in one respect, a flow chart of steps/processes performed by a UE having a plurality of antenna panels, and operating in a communication system having network nodes. In another respect.

Further aspects of embodiments consistent with the invention will now be described with reference to FIG. 8, which depicts, in one respect, a flow chart of steps/processes performed by a UE 601 having a plurality of antenna panels, and operating in a communication system having network nodes. In another respect, FIG. 8 also depicts an arrangement 800 of various circuitry configured to perform the actions as set out in the figure, and as further described herein, such circuitry being comprised in a network node (e.g., one or more communications network elements, such as processors).

The aim of the depicted process is to configure spatially QCL reference signal resources in the UE 601 having more than one antenna panel. The exemplary embodiment begins with the UE 601 communicating, to one or more communication network elements (hereinafter, "network node" in order to ease the discussion), information indicating a number of antenna panels in the UE 601 (i.e., information directly or indirectly—e.g. by specifying a particular number of SRS resource sets to be selected—telling the network node how many antenna panels the UE 601 has) (step 801).

The UE 601 then receives, from the network node, information about which reference signal resource sets have been selected (step 803), wherein each reference signal resource set comprises identities of one or more reference signal resources to be used by the wireless communication device when transmitting a sounding reference signal. In this exemplary embodiment, the network node 625 does not inform the UE about which SRS resource set goes with which antenna panel; that allocation is entirely up to the UE 601. Consequently, the UE 601 maps a different one of the selected resource sets to respective ones of the antenna panels (step 805), and for each one of the antenna panels, performs a plurality of transmissions from the antenna panel (step 807), each transmission including a sounding reference signal and being transmitted using a different one of the reference signal resources included in the reference signal resource set that was mapped to that antenna panel. The UE 601 can adopt any strategy for performing the mapping, including arbitrary pairing of antenna panels with reference signal resource sets.

Following these transmissions, the UE 601 receives via higher layer signaling from the network node, a higher layer data structure containing information indicating the selected reference signal resources to be allocated to the antenna panels (step 809). The UE 601 then uses the received information indicating the selected reference signal resources to update a reference signal resource set to be used when performing codebook-based transmissions (step 811). The update can be, for example, updating the SRS-SpatialRelationInfo parameter to include an SRS resource for each of the antenna panels. In one embodiment, the UE 601 assigns each selected SRS resource to a respective one of the antenna panels based on its knowledge of the mapping that it applied earlier. In alternative embodiments, the network node could itself directly or indirectly indicate which SRS resource is to be assigned to which antenna panel.

At this point, the UE 601 is now configured, and sometime later can (e.g., when triggered by the network node) perform a transmission (e.g., a codebook-based transmission, or channel sounding for DL reciprocity) using the updated reference signal resource set (step 813). In this way, each antenna panel transmits a beam that is best suited for transmission to the network node.

Figure 9:
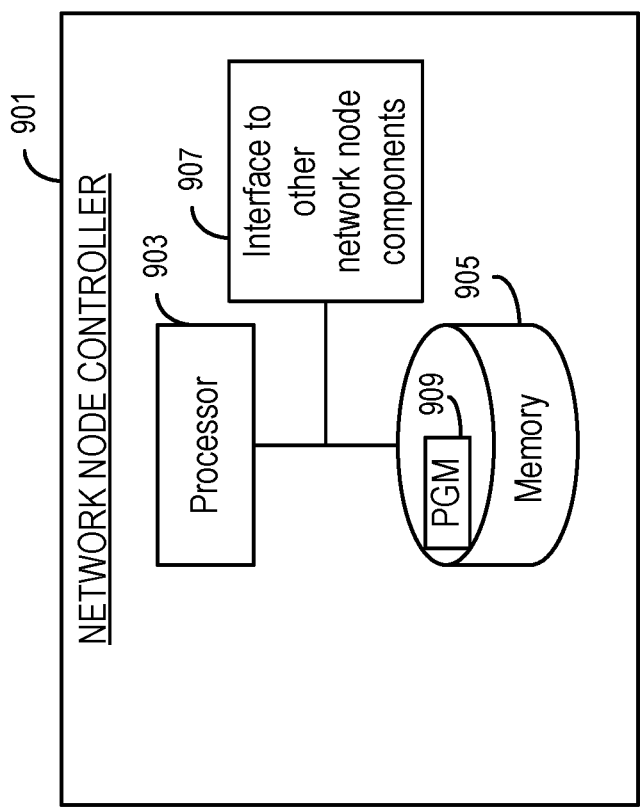
FIG. 9 illustrates an exemplary controller of a network node (single entity or distributed across multiple communication network elements), in accordance with some but not necessarily all exemplary embodiments consistent with the invention.

Other aspects of an exemplary station network node are shown in FIG. 9, which illustrates an exemplary controller 901 of a network node (single entity or distributed), in accordance with some but not necessarily all exemplary embodiments consistent with the invention. In particular, the controller includes circuitry configured to carry out any one or any combination of the various functions described above with respect to the network node 625. Such circuitry could, for example, be entirely hard-wired circuitry (e.g., one or more Application Specific Integrated Circuits—"ASICs"). Depicted in the exemplary embodiment of FIG. 9, however, is programmable circuitry, comprising a processor 903 coupled to one or more memory devices 905 (e.g., Random Access Memory, Magnetic Disc Drives, Optical Disk Drives, Read Only Memory, etc.) and to an interface 907 that enables bidirectional communication with other elements/components of the network node. The memory device(s) 905 store program means 909 (e.g., a set of processor instructions) configured to cause the processor 903 to control other network node elements so as to carry out any of the aspects described above, such as but not limited to those described with reference to FIGS. 6B, 6C, 6D, and 7. The memory device(s) 905 may also store data (not shown) representing various constant and variable parameters as may be needed by the processor 903 and/or as may be generated when carrying out its functions such as those specified by the program means 909.

Figure 5:
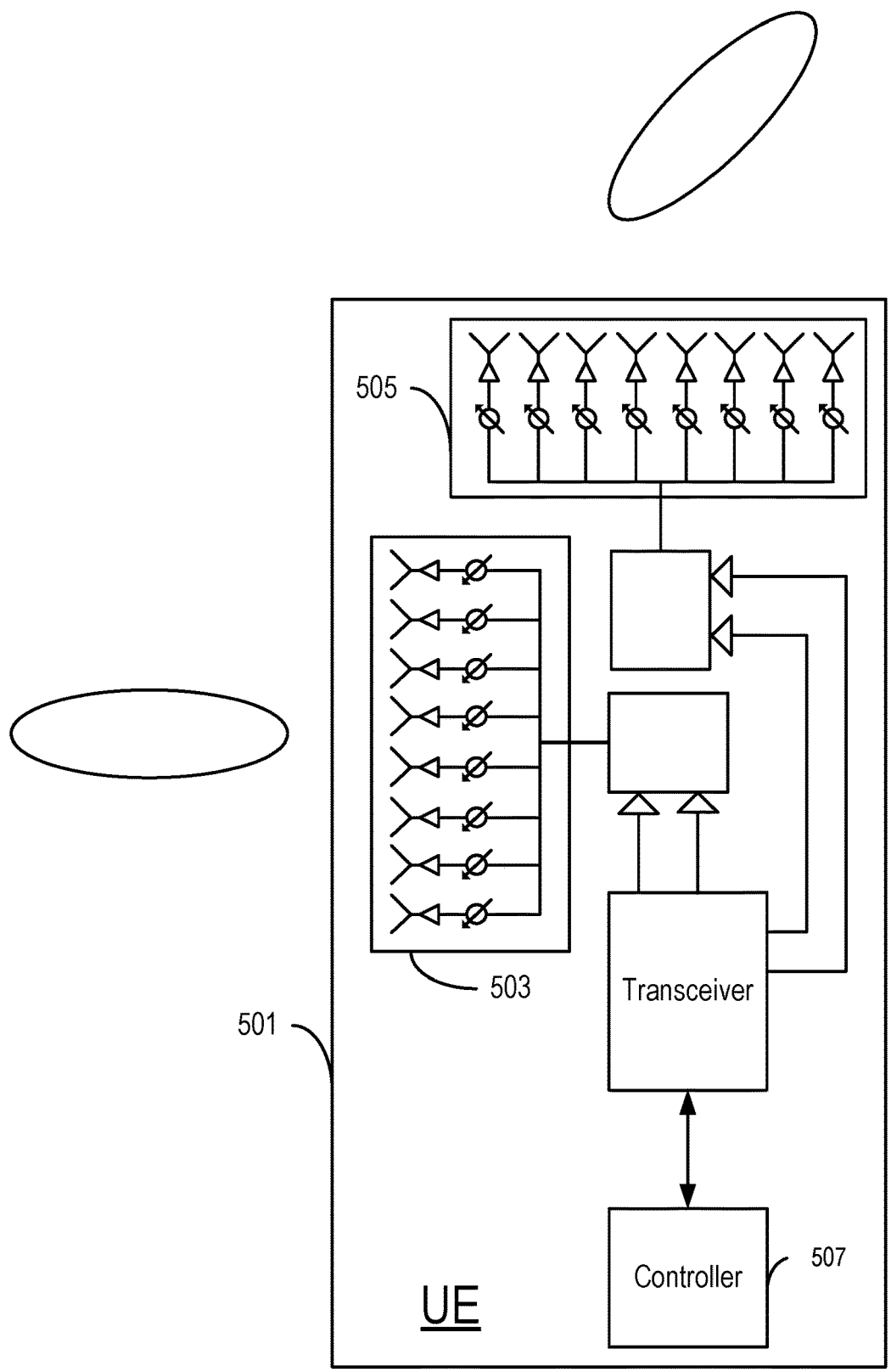
FIG. 5 illustrates a non-limiting example of a UE having two one-dimensional antenna panels located in different directions.
Figure 10:
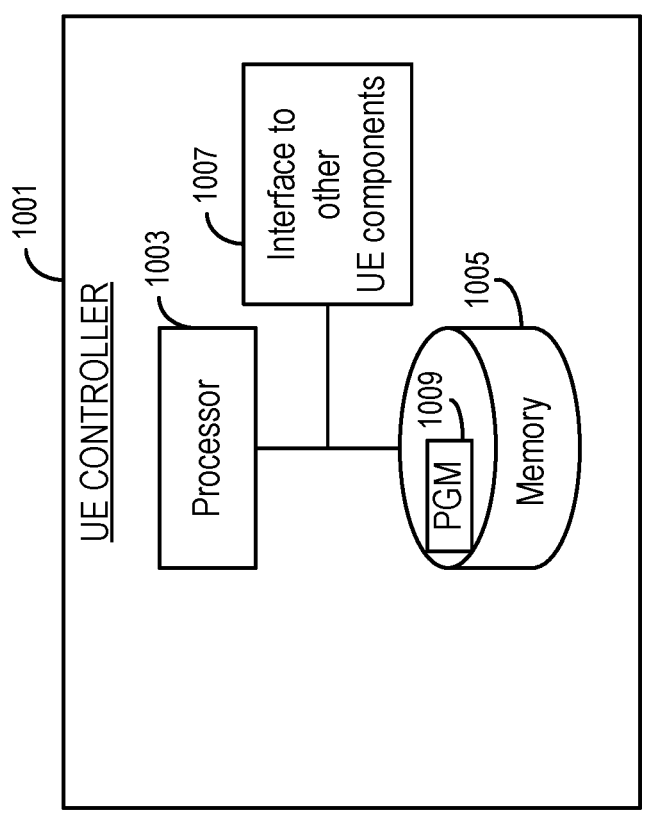
FIG. 10 illustrates an exemplary controller of a UE in accordance with some but not necessarily all exemplary embodiments consistent with the invention.

Other aspects of an exemplary UE (wireless communication device) are shown in FIG. 10, which illustrates an exemplary controller 1001 of a UE, in accordance with some but not necessarily all exemplary embodiments consistent with the invention. The exemplary controller 1001 could be, for example, a controller 507 as shown in FIG. 5, and/or the controller 613 as shown in FIG. 6A. In particular, the controller 1001 includes circuitry configured to carry out any one or any combination of the various functions described above with respect to the UE 601. Such circuitry could, for example, be entirely hard-wired circuitry (e.g., one or more Application Specific Integrated Circuits—"ASICs"). Depicted in the exemplary embodiment of FIG.

10, however, is programmable circuitry, comprising a processor 1003 coupled to one or more memory devices 1005 (e.g., Random Access Memory, Magnetic Disc Drives, Optical Disk Drives, Read Only Memory, etc.) and to an interface 1007 that enables bidirectional communication with other elements/components of the UE 601. The memory device(s) 1005 store program means 1009 (e.g., a set of processor instructions) configured to cause the processor 1003 to control other UE elements so as to carry out any of the aspects described above, such as but not limited to those described with reference to FIGS. 6B, 6C, 6D, and 8. The memory device(s) 905 may also store data (not shown) representing various constant and variable parameters as may be needed by the processor 1003 and/or as may be generated when carrying out its functions such as those specified by the program means 1009.

The herein-described technology provides a number of advantages over conventional technology. For example, and without limitation, UEs having multiple antenna panels and no beam correspondence can use UL beam management for all panels and not just for one of the panels, and this in turn provides improved UE performance (e.g., by enabling multiple antenna panels to be used for codebook based UL transmissions).

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of configuring spatially Quasi Co-Located (QCL) reference signal resources in a wireless communication device having a plurality of antenna panels, wherein the method is performed by one or more communication network elements communicating with the wireless communication device, and the method comprises:
    obtaining information that directly or implicitly indicates a number of antenna panels in the wireless communication device;
    selecting, for the antenna panels, a corresponding number of reference signal resource sets to be used in a reference signal resource selection process, wherein each reference signal resource set comprises identities of one or more reference signal resources to be used by the wireless communication device when transmitting a sounding reference signal;
    informing the wireless communication device about which reference signal resource sets have been selected for the plurality of antenna panels;
    receiving, from each of the antenna panels, the sounding reference signal on each one of a plurality of transmissions, each transmission being performed by the antenna panel using a different one of the reference signal resources of the reference signal resource set selected for the antenna panel;
    for each one of the antenna panels, assessing the received transmissions from said one of the antenna panels, and selecting as a best transmission from said one of the antenna panels, one of the assessed transmissions based on one or more predefined transmission selection criteria, and for each best transmission selecting a corresponding reference signal resource that was used in performance of the best transmission; and
    sending in one higher layer data structure, information indicating the selected reference signal resources for the plurality of antenna panels.

2. The method of claim 1, wherein the one data structure is a Medium Access Control (MAC) Control Element (CE).

3. The method of claim 1, wherein the one data structure is a Radio Resource Control (RRC) message.

4. The method of claim 1, wherein the one data structure is an SRS-SpatialRelationInfo parameter of an SRS resource set.

5. A method of configuring spatially Quasi Co-Located (QCL) reference signal resources in a wireless communication device having a plurality of antenna panels, the method performed by the wireless communication device and comprising:
    communicating to one or more communication network elements communicating with the wireless communication device, information that directly or implicitly indicates a number of antenna panels in the wireless communication device;
    receiving, from the one or more communication network elements, information about which reference signal resource sets have been selected, wherein each reference signal resource set comprises identities of one or more reference signal resources to be used by the wireless communication device when transmitting a sounding reference signal;
    mapping a different one of the selected resource sets to respective ones of the antenna panels;
    for each one of the antenna panels, performing a plurality of transmissions from said one of the antenna panels, each transmission including a sounding reference signal and being transmitted using a different one of the reference signal resources included in the reference signal resource set that was mapped to said one of the antenna panels;
    receiving in one higher layer data structure, from the one or more communication network elements, information indicating the selected reference signal resources for the plurality of antenna panels; and
    using the received information indicating the selected reference signal resources for the plurality of antenna panels to update a reference signal resource set to be used when performing codebook-based transmissions.

6. The method of claim 5, wherein the one data structure is a Medium Access Control (MAC) Control Element (CE).

7. The method of claim 5, wherein the one data structure is a Radio Resource Control (RRC) message.

8. The method of claim 5, wherein the one data structure is an SRS-SpatialRelationInfo parameter of an SRS resource set.

9. The method of claim 5, comprising:
    performing a codebook-based transmission using the updated reference signal resource set.

10. An apparatus for configuring spatially Quasi Co-Located (QCL) reference signal resources in a wireless communication device having a plurality of antenna panels, wherein the apparatus controls one or more communication network elements communicating with the wireless communication device, and the apparatus comprises:
    circuitry configured to obtain information that directly or implicitly indicates a number of antenna panels in the wireless communication device;
    circuitry configured to select, for each of the antenna panels, a corresponding number of reference signal resource sets to be used in a reference signal resource selection process, wherein each reference signal resource set comprises identities of one or more reference signal resources to be used by the wireless communication device when transmitting a sounding reference signal;

circuitry configured to inform the wireless communication device about which reference signal resource sets have been selected for the plurality of antenna panels;

circuitry configured to receive, from each of the antenna panels, the sounding reference signal on each one of a plurality of transmissions, each transmission being performed by the antenna panel using a different one of the reference signal resources of the reference signal resource set selected for the antenna panel;

circuitry configured to assess, for each one of the antenna panels, the received transmissions from said one of the antenna panels, and to select as a best transmission from said one of the antenna panels, one of the assessed transmissions based on one or more predefined transmission selection criteria, and for each best transmission to select a corresponding reference signal resource that was used in performance of the best transmission; and circuitry configured to send in one higher layer data structure, information indicating the selected reference signal resources for each of the antenna panels.

11. The apparatus of claim 10, wherein the one data structure is a Medium Access Control (MAC) Control Element (CE).

12. The apparatus of claim 10, wherein the one data structure is a Radio Resource Control (RRC) message.

13. The apparatus of claim 10, wherein the one data structure is a SpatialRelationInfo parameter of an SRS resource set.

14. An apparatus for configuring spatially Quasi Co-Located (QCL) reference signal resources in a wireless communication device having a plurality of antenna panels, the apparatus comprising:

circuitry configured to communicate to one or more communication network elements, information that directly or implicitly indicates a number of antenna panels in the wireless communication device;

circuitry configured to receive, from the one or more communication network elements, information about which reference signal resource sets have been selected, wherein each reference signal resource set comprises identities of one or more reference signal resources to be used by the wireless communication device when transmitting a sounding reference signal;

circuitry configured to map a different one of the selected resource sets to respective ones of the antenna panels;

circuitry configured to perform, for each one of the antenna panels, a plurality of transmissions from said one of the antenna panels, each transmission including a sounding reference signal and being transmitted using a different one of the reference signal resources included in the reference signal resource set that was mapped to said one of the antenna panels;

circuitry configured to receive in one higher layer data structure, from the one or more communication network elements, information indicating the selected reference signal resources for the plurality of antenna panels; and circuitry configured to use the received information indicating the selected reference signal resources for the plurality of antenna panels to update a reference signal resource set to be used when performing codebook-based transmissions.

15. The apparatus of claim 14, wherein the one data structure is a Medium Access Control (MAC) Control Element (CE).

16. The apparatus of claim 14, wherein the one data structure is a Radio Resource Control (RRC) message.

17. The apparatus of claim 14, wherein the one data structure is a SpatialRelationInfo parameter of an SRS resource set.

18. The apparatus of claim 14, comprising:
circuitry configured to perform a codebook-based transmission using the updated reference signal resource set.

19. A non-transitory computer readable medium comprising instructions that, when performed by one or more processors of one or more communication network elements, cause the one or more processors to perform a method of configuring spatially Quasi Co-Located (QCL) reference signal resources in a wireless communication device having a plurality of antenna panels, wherein the method is performed by the one or more communication network elements communicating with the wireless communication device, and the method comprises:

obtaining information that directly or implicitly indicates a number of antenna panels in the wireless communication device;

selecting, for the antenna panels, a corresponding number of reference signal resource sets to be used in a reference signal resource selection process, wherein each reference signal resource set comprises identities of one or more reference signal resources to be used by the wireless communication device when transmitting a sounding reference signal;

informing the wireless communication device about which reference signal resource sets have been selected for the plurality of antenna panels;

receiving, from each of the antenna panels, the sounding reference signal on each one of a plurality of transmissions, each transmission being performed by the antenna panel using a different one of the reference signal resources of the reference signal resource set selected for the antenna panel;

for each one of the antenna panels, assessing the received transmissions from said one of the antenna panels, and selecting as a best transmission from said one of the antenna panels, one of the assessed transmissions based on one or more predefined transmission selection criteria, and for each best transmission selecting a corresponding reference signal resource that was used in performance of the best transmission; and sending in one higher layer data structure, information indicating the selected reference signal resources for the plurality of antenna panels.

20. A non-transitory computer readable medium comprising instructions that, when performed by one or more processors of a wireless communication device having a plurality of antenna panels, cause the one or more processors to perform a method of configuring spatially Quasi Co-Located (QCL) reference signal resources in the wireless communication device, the method comprising:

communicating to one or more communication network elements communicating with the wireless communication device, information that directly or implicitly indicates a number of antenna panels in the wireless communication device;

receiving, from the one or more communication network elements, information about which reference signal resource sets have been selected, wherein each reference signal resource set comprises identities of one or more reference signal resources to be used by the wireless communication device when transmitting a sounding reference signal;

mapping a different one of the selected resource sets to respective ones of the antenna panels;

for each one of the antenna panels, performing a plurality of transmissions from said one of the antenna panels, each transmission including a sounding reference signal and being transmitted using a different one of the reference signal resources included in the reference signal resource set that was mapped to said one of the antenna panels;

receiving in one higher layer data structure, from the one or more communication network elements, information indicating the selected reference signal resources for the plurality of antenna panels; and using the received information indicating the selected reference signal resources for the plurality of antenna panels to update a reference signal resource set to be used when performing codebook-based transmissions.

* * * * *

UNITED STATES PATENT AND TRADEMARK OFFICE
CERTIFICATE OF CORRECTION

PATENT NO. : 10,742,303 B1  
APPLICATION NO. : 15/757345  
DATED : August 11, 2020  
INVENTOR(S) : Andreas Nilsson It is certified that error appears in the above-identified patent and that said Letters Patent is hereby corrected as shown below:

On the Title Page

On Page 2, item (57), under "ABSTRACT", in Column 1, Line 7, delete "used" and insert -- uses --, therefor.

In the Specification

In Column 2, Line 6, delete "links" and insert -- links. --, therefor.

In Column 3, Line 42, delete "uplink" and insert -- uplink. --, therefor.

In Column 3, Line 56, delete "streams" and insert -- streams. --, therefor.

In Column 5, Line 31, delete "beams" and insert -- beams. --, therefor.

In Column 5, Line 48, delete "p2 if" and insert -- if --, therefor.

In Column 8, Line 16, delete "uplink" and insert -- uplink. --, therefor.

In Column 10, Line 15, delete "SRS set 617 and SRS resource 3" and insert -- SRS resource set 617 and SRS resource 2 --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*